(12) United States Patent
Hoffmeyer et al.

(10) Patent No.: US 10,145,314 B2
(45) Date of Patent: Dec. 4, 2018

(54) MOTOR VEHICLE, CONTROL UNIT AND METHOD FOR CONTROLLING A PHASE ANGLE OF A CAMSHAFT

(71) Applicant: VOLKSWAGEN AKTIENGESELLSCHAFT, Wolfsburg (DE)

(72) Inventors: Henrik Hoffmeyer, Hannover (DE); Lars Petersen, Meinersen (DE); Stephan Schwieger, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 21 days.

(21) Appl. No.: 15/261,907

(22) Filed: Sep. 10, 2016

(65) Prior Publication Data

US 2016/0377002 A1   Dec. 29, 2016

Related U.S. Application Data

(63) Continuation of application No. PCT/EP2015/055089, filed on Mar. 11, 2015.

(30) Foreign Application Priority Data

Mar. 12, 2014  (DE) .................. 10 2014 204 492

(51) Int. Cl.
*F02D 41/00* (2006.01)
*F02D 13/02* (2006.01)
(Continued)

(52) U.S. Cl.
CPC .......... *F02D 13/0219* (2013.01); *F01L 1/344* (2013.01); *F02D 41/0002* (2013.01);
(Continued)

(58) Field of Classification Search
CPC ............. F02D 13/0219; F02D 41/0097; F02D 41/1459; F02D 41/26; F02D 41/2422;
(Continued)

(56) References Cited

U.S. PATENT DOCUMENTS

| 5,609,126 A | 3/1997 | Cullen et al. |
| 6,371,066 B1 | 4/2002 | Cullen |

(Continued)

FOREIGN PATENT DOCUMENTS

| CN | 100441844 C | 12/2008 |
| CN | 101990596 A | 3/2011 |

(Continued)

OTHER PUBLICATIONS

Office action including search report for corresponding Russian Patent Application No. 2016139581/07 (063118), issued by the Russian Federal Service for Intellectual Property, dated Mar. 16, 2017.

(Continued)

*Primary Examiner* — Joseph Dallo
*Assistant Examiner* — Kurt Liethen
(74) *Attorney, Agent, or Firm* — Manfred Beck, P.A.

(57) ABSTRACT

A control unit for controlling a phase angle of a first camshaft of an internal combustion engine includes a first characteristic diagram signal generator for determining a dynamic setpoint phase angle of the first camshaft, a second characteristic diagram signal generator for determining a static setpoint phase angle of the first camshaft, and a first interpolator for determining a corrected setpoint phase angle of the first camshaft based on the dynamic setpoint phase angle of the first camshaft and on the static setpoint phase angle of the first camshaft. A motor vehicle including a control unit for controlling a phase angle of a first camshaft of an internal combustion engine and a method for control- (Continued)

ling a phase angle of a first camshaft of an internal combustion engine are also provided.

20 Claims, 1 Drawing Sheet

(51) Int. Cl.
F02D 41/24 (2006.01)
F02D 41/10 (2006.01)
F01L 1/344 (2006.01)
F02D 41/14 (2006.01)
F02D 41/26 (2006.01)

(52) U.S. Cl.
CPC ......... *F02D 41/0097* (2013.01); *F02D 41/10* (2013.01); *F02D 41/1459* (2013.01); *F02D 41/2416* (2013.01); *F02D 41/2422* (2013.01); *F02D 41/26* (2013.01); *F01L 2201/00* (2013.01); *F02D 2041/001* (2013.01); *F02D 2041/002* (2013.01); *F02D 2200/0406* (2013.01); *F02D 2200/101* (2013.01); *F02D 2200/60* (2013.01); *Y02T 10/18* (2013.01); *Y02T 10/42* (2013.01)

(58) Field of Classification Search
CPC .. F02D 41/10; F02D 41/2416; F02D 41/0002; F02D 2200/101; F02D 2200/0406; F02D 2200/60; F01L 1/344; F01L 2201/00; Y02T 10/01
See application file for complete search history.

(56) References Cited

U.S. PATENT DOCUMENTS

| | | | | |
|---|---|---|---|---|
| 6,718,920 | B2* | 4/2004 | Hoshino | F01L 1/34 123/90.15 |
| 9,163,576 | B2* | 10/2015 | Sherwin | F02D 41/009 |
| 2003/0230262 | A1 | 12/2003 | Quinn, Jr. | |
| 2004/0255886 | A1* | 12/2004 | Mezger | F01L 1/3442 123/90.15 |
| 2005/0155565 | A1 | 7/2005 | Mencher et al. | |
| 2005/0205031 | A1 | 9/2005 | Okamoto et al. | |
| 2006/0136118 | A1 | 6/2006 | Haluska | |
| 2007/0012096 | A1 | 1/2007 | Galtier et al. | |
| 2007/0289564 | A1* | 12/2007 | Dingl | F02D 41/0002 123/90.17 |
| 2010/0036580 | A1 | 2/2010 | Hartmann et al. | |
| 2010/0037842 | A1 | 2/2010 | Hattori et al. | |
| 2010/0154522 | A1 | 6/2010 | Carbonne et al. | |
| 2011/0118918 | A1 | 5/2011 | Falkenstein et al. | |
| 2013/0247853 | A1 | 9/2013 | Mikawa | |
| 2014/0053809 | A1* | 2/2014 | Betz | F01L 13/0031 123/406.14 |
| 2015/0134230 | A1 | 5/2015 | Hoffmeyer et al. | |
| 2015/0152792 | A1 | 6/2015 | Eser et al. | |

FOREIGN PATENT DOCUMENTS

| | | |
|---|---|---|
| CN | 102828844 A | 12/2012 |
| DE | 4028442 A1 | 3/1992 |
| DE | 10347516 B3 | 6/2005 |
| DE | 10360333 A1 | 7/2005 |
| DE | 60301176 T2 | 1/2006 |
| DE | 102004039216 A1 | 4/2006 |
| DE | 102005035239 A1 | 2/2007 |
| DE | 102005047446 A1 | 4/2007 |
| DE | 60128997 T2 | 2/2008 |
| DE | 102011088403 B3 | 1/2013 |
| DE | 102012014713 A1 | 1/2014 |
| EP | 1128027 A2 | 8/2001 |
| EP | 1229215 B1 | 12/2005 |
| RU | 2432479 C2 | 10/2011 |

OTHER PUBLICATIONS

Search Report including Provisional Assessment of Patentability issued by the German Patent and Trademark Office for German Patent Application No. DE 10 2014 204 492.8, dated Oct. 23, 2014.
International Search Report for International Application No. PCT/EP2015/055089 and translation thereof, dated Jun. 15, 2015.
International Preliminary Report on Patentability for International Application No. PCT/EP2015/055089 including Written Opinion of the International Searching Authority and translation thereof, dated Sep. 13, 2016.
Translation of a Search Report, dated Jul. 3, 2018, issued by the State Intellectual Property Office of People's Republic of China for Chinese Patent Application No. 201580013476.1 which is related to U.S. Appl. No. 15/261,907.

* cited by examiner

MOTOR VEHICLE, CONTROL UNIT AND METHOD FOR CONTROLLING A PHASE ANGLE OF A CAMSHAFT

CROSS-REFERENCE TO RELATED APPLICATIONS

This application is a continuation, under 35 U.S.C. § 120, of copending International Application No. PCT/EP2015/055089, filed Mar. 11, 2015, which designated the United States; this application also claims the priority, under 35 U.S.C. § 119, of German Patent Application No. DE 10 2014 204 492.8, filed Mar. 12, 2014; the prior applications are herewith incorporated by reference in their entirety.

BACKGROUND OF THE INVENTION

Field of the Invention

The invention generally relates to a control unit for controlling a phase angle of a first camshaft of an internal combustion engine, to a motor vehicle having such a control unit and to a method for controlling a phase angle of a first camshaft of an internal combustion engine.

The reaction behavior of an internal combustion engine to changes in the requested engine power or in the requested torque can be improved by dynamic control of the phase angle of a camshaft. While motor vehicle users who have a sporty orientation appreciate a drive unit of their motor vehicle with the highest possible response dynamics, there may also be important reasons to not always completely exploit the best possible response behavior of the drive unit. Inter alia, the following may be reasons for performing intentional throttling of the best possible response dynamics of the drive unit of a motor vehicle. For example, it may be the case that a defensive driving style is aimed at by certain vehicle users or for certain vehicle users or under certain weather conditions. Throttling of the response dynamics of the drive unit owing to lower fuel consumption per kilometer traveled, lower emissions of pollutants and lower wear of vehicle parts can also contribute to protecting resources. Furthermore, it is conceivable that owing to legal specifications or owing to a product concept or sales concept particularly high response dynamics of the drive unit are to be reserved for certain vehicle users and/or certain vehicle configurations. Consequently, there is a need for a technical solution with which response dynamics of an internal combustion engine can be configured or adjusted in a reliable way.

German Patent DE 10 2011 088 403 B3 describes a method for determining a value for a valve stroke of an individual cylinder of an internal combustion engine having a plurality of cylinders.

German Patent Application DE 10 2004 039 216 A1 describes a method for controlling an internal combustion engine having a camshaft which acts on gas exchange valves. In order to control an actuator element of a phase adjustment device, a correction value for a phase between the camshaft and a crankshaft is determined by an iterative numerical optimization method which uses measuring data sets. Inter alia, a value field for rotational speed and intake manifold pressure is also respectively provided in each of the measuring data sets. The optimization method is computationally costly and unwieldy in its method of operation, with the result that it is difficult to adjust the response dynamics of the internal combustion engine.

SUMMARY OF THE INVENTION

It is accordingly an object of the invention to provide a control unit, a motor vehicle and a method for controlling a phase angle of a camshaft which at least partially overcome the above-mentioned disadvantages of the heretofore-known methods and devices of this general type.

With the foregoing and other objects in view there is provided, in accordance with the invention, a control unit for controlling a phase angle of a first camshaft of an internal combustion engine, including:

a first characteristic diagram signal generator for determining a dynamic setpoint phase angle of the first camshaft;

a second characteristic diagram signal generator for determining a static setpoint phase angle of the first camshaft; and a first interpolator for determining a corrected setpoint phase angle of the first camshaft based on the dynamic setpoint phase angle of the first camshaft and on the static setpoint phase angle of the first camshaft, wherein the dynamic setpoint phase angle of the first camshaft is determined by the first characteristic diagram signal generator, and wherein the static setpoint phase angle of the first camshaft is determined by the second characteristic diagram signal generator.

In other words, the control unit according to the invention for controlling a phase angle of a first camshaft of an internal combustion engine has a first characteristic diagram signal generator for determining a dynamic setpoint phase angle of the first camshaft and a second characteristic diagram signal generator for determining a static setpoint phase angle of the first camshaft. Furthermore, the control unit has a first interpolator for determining a corrected setpoint phase angle of the first camshaft on the basis of the dynamic setpoint phase angle, determined by the first characteristic diagram signal generator, of the first camshaft and of a static setpoint phase angle, determined by the second characteristic diagram signal generator, of the first camshaft.

The first camshaft can be an inlet camshaft for activating inlet valves or an outlet camshaft for activating outlet valves or a common camshaft for simultaneously activating inlet valves and outlet valves of an internal combustion engine. The internal combustion engine is typically a drive unit of a vehicle. The vehicle can be a land vehicle, a watercraft or an aircraft. The land vehicle can be, for example, a passenger car, a truck or a bus. The internal combustion engine can be a spark ignition engine or a diesel engine. It can have a turbocharger, any desired number of cylinders, e.g. three, four, five, six, eight or twelve etc. The phase angle of the camshaft is adjustable, as is generally known, in order to change the control times of inlet valves or outlet valves of the internal combustion engine, as is also known in the prior art.

The internal combustion engine correspondingly has a variable valve control which is controlled by the phase angle of the camshaft.

The term characteristic diagram signal generator denotes here an electronic (hydraulic, pneumatic or mechanical) circuit which is configured to receive at least two input variables (for example rotational speed information and intake manifold pressure information) and to output in each case an output value corresponding to a characteristic diagram of the characteristic diagram signal generator for currently input combinations of input variables (i.e. for vectors with at least two input variables). In order to input the input variables and to output the output variables, the characteristic diagram signal generator can respectively have digital (and/or analog) input interfaces and output interfaces.

The control unit can have one or more processors or the like in which the functions described herein are implemented.

A concept of the invention can be considered that an interpolation is carried out between a dynamic setpoint phase angle of the first camshaft and a static setpoint phase angle of the first camshaft.

The dynamic setpoint phase angle of the first camshaft is determined through the use of a first characteristic diagram which is optimized with respect to a response behavior of the internal combustion engine, i.e. with respect to a maximum torque output, for which reason the term "dynamic" is also used here. Consequently, at the dynamic setpoint phase angle of the first camshaft the inlet valves and/or outlet valves of the internal combustion engine are controlled in such a way that the internal combustion engine makes available a maximum torque.

The static setpoint phase angle of the first camshaft is determined from a second characteristic diagram which is optimized with respect to an optimum efficiency level of the internal combustion engine. At the static setpoint phase angle of the first camshaft, the inlet valves and/or outlet valves of the internal combustion engine are controlled in such a way that the internal combustion engine is operated at a high, in particular maximum, efficiency level.

A maximum torque is to be understood here as meaning a torque which is not exclusively a theoretical possible maximum torque but rather the torque which is achieved with the first (dynamic, torque-optimized) characteristic diagram and which is typically higher than the torque which the internal combustion engine makes available when it is operated with the second (static, consumption-optimized) characteristic diagram.

As a result of the interpolation between the dynamic setpoint phase angle and the static setpoint phase angle it is possible to "shift" the phase angle of the camshaft from a static setpoint phase angle to a dynamic phase angle if e.g. it is detected that the motor vehicle is to accelerate and therefore the internal combustion engine is to correspondingly make available torque.

According to a feature of the invention, the corrected setpoint phase angle of the first camshaft is determined based on a torque request.

The determination of a corrected setpoint phase angle which takes into account e.g. an acceleration request and the associated torque request, is carried out by an interpolation between the static setpoint phase angle and the dynamic setpoint phase angle of the first camshaft.

In some embodiments, the interpolation can be carried out by determining an average value between the static and the dynamic setpoint phase angle of the first camshaft, which is very simple.

According to another feature of the invention, the first interpolator is configured to determine the corrected setpoint phase angle of the first camshaft based on an interpolation factor.

The interpolation can thus also be carried out on the basis of an interpolation factor. In some embodiments, the first interpolator is correspondingly configured to determine the corrected setpoint phase angle of the first camshaft on the basis of an interpolation factor, wherein the interpolation factor does not have to be fixed but rather can be variable and can be between, for example, 0 and 1. With a variable interpolation factor, response dynamics of a drive unit which has the internal combustion engine with the first camshaft can be achieved as a function of certain operating parameters such as, for example, as a function of a charge deviation of a cylinder of the internal combustion engine and/or a rotational speed of the internal combustion engine (also referred to below as "engine rotational speed").

In some embodiments, the interpolation factor is also determined on the basis of a desired setpoint torque of the internal combustion engine. For this purpose, an actual torque of the internal combustion engine is determined and the interpolation factor is determined in such a way that the setpoint torque is achieved by changing the control of the first camshaft. In this context, the interpolation factor can be between 0 and 1, wherein "1" specifies the greatest difference between the actual torque and the setpoint torque. As soon as the setpoint torque is reached, the phase angle of the first camshaft can be controlled again on the basis of the steady-state characteristic diagram.

According to another feature of the invention, the control unit includes a third characteristic diagram signal generator for determining the interpolation factor based on an engine rotational speed of the internal combustion engine and/or a charge deviation of a cylinder of the internal combustion engine.

In some embodiments, the control unit has a third characteristic diagram signal generator for determining the interpolation factor taking into account the engine rotational speed and a charge deviation of a cylinder, wherein the characteristic diagram signal generator determines the interpolation factor from a third characteristic diagram. As a result, an acceleration behavior or a rotational speed change behavior of the internal combustion engine can be adjusted or influenced. The charge deviation can assume both positive and negative values.

According to another feature of the invention, the control unit includes a fourth characteristic diagram signal generator for determining a dynamic setpoint phase angle of a second camshaft of the internal combustion engine; a fifth characteristic diagram signal generator for determining a static setpoint phase angle of the second camshaft; and a second interpolator for determining a corrected setpoint phase angle of the second camshaft based on the dynamic setpoint phase angle of the second camshaft and on the static setpoint phase angle of the second camshaft, wherein the dynamic setpoint phase angle of the second camshaft is determined by the fourth characteristic diagram signal generator, and wherein the static setpoint phase angle of the second camshaft is determined by the fifth characteristic diagram signal generator.

In some embodiments, the control unit thus additionally has the following components: a fourth characteristic diagram signal generator for determining a dynamic setpoint phase angle of a second camshaft (e.g. an outlet camshaft, when the first camshaft is an inlet camshaft) of the internal combustion engine, and a second interpolator for determining a corrected setpoint phase angle of the second camshaft taking into account the dynamic setpoint phase angle, determined by the fourth characteristic diagram signal generator, of the second camshaft and a static setpoint phase angle, determined by a fifth characteristic diagram signal generator, of the second camshaft.

As a result, it is also possible to determine for a second camshaft an optimum dynamic setpoint phase angle of the second camshaft, which is dependent on an operating state of the internal combustion engine. When the first camshaft is an inlet camshaft for activating inlet valves, the second camshaft can be, for example, an outlet camshaft for activating outlet valves of the internal combustion engine or a common camshaft for simultaneously activating inlet and output valves. When the first camshaft is an outlet camshaft for activating outlet valves, the second camshaft can, for example, be an inlet camshaft for activating inlet valves of the internal combustion engine or a common camshaft for simultaneously activating inlet and outlet valves of the internal combustion engine.

According to another feature of the invention, the control unit includes a sixth characteristic diagram signal generator for determining a dynamic setpoint ignition angle of the internal combustion engine; a seventh characteristic diagram signal generator for determining a static setpoint ignition angle of the internal combustion engine; and a third interpolator for determining a corrected setpoint ignition angle based on the dynamic setpoint ignition angle of the internal combustion engine determined by the sixth characteristic diagram signal generator and based on the static setpoint ignition angle of the internal combustion engine determined by the seventh characteristic diagram signal generator.

In some embodiments, the control unit thus additionally has the following components: a sixth characteristic diagram signal generator for determining a dynamic setpoint ignition angle of the internal combustion engine and a third interpolator for determining a corrected setpoint ignition angle taking into account the dynamic setpoint ignition angle determined by the sixth characteristic diagram signal generator and a static setpoint ignition angle, determined by a seventh characteristic diagram signal generator, of the internal combustion engine. As a result, an optimum dynamic setpoint ignition angle which is dependent on an operating state of the internal combustion engine can also be determined.

According to another feature of the invention, the second interpolator is configured to determine the corrected setpoint phase angle of the second camshaft based on the interpolation factor.

According to a further feature of the invention, the third interpolator is configured to determine the corrected setpoint ignition angle based on the interpolation factor.

In some embodiments, the second interpolator is thus configured to take into account the interpolation factor in the determination of the corrected setpoint phase angle of the second camshaft. Irrespective of this, it may be expedient if the third interpolator is configured to take into account the interpolation factor in the determination of the corrected setpoint ignition angle. Each of the two abovementioned measures is suitable for adjusting or influencing response dynamics of the internal combustion engine, e.g. also as a function of a torque request.

According to another feature of the invention, at least one characteristic diagram signal generator selected from the group including the first characteristic diagram signal generator, the second characteristic diagram signal generator, the fourth characteristic diagram signal generator, the fifth characteristic diagram signal generator, the sixth characteristic diagram signal generator, and the seventh characteristic diagram signal generator is configured to determine an output value respectively made available by it, based on an engine rotational speed of the internal combustion engine and/or an intake manifold pressure of the internal combustion engine.

In some embodiments, the first characteristic diagram signal generator and/or the second characteristic diagram signal generator and/or the fourth characteristic diagram signal generator and/or the fifth characteristic diagram signal generator and/or the sixth characteristic diagram signal generator and/or the seventh characteristic diagram signal generator are/is configured to determine the output value respectively made available by it, taking into account an engine rotational speed and an intake manifold pressure. Value pairs of engine rotational speed and intake manifold pressure are suitable for differentiating operating states of an internal combustion engine from one another and for determining optimum static and dynamic setpoint phase angles of camshafts which are dependent on this differentiation and for determining optimum static and dynamic setpoint ignition angles which are dependent on this differentiation.

According to another feature of the invention, the control unit is configured to select at least one parameter selected from the group including the interpolation factor, a first characteristic diagram of the first characteristic diagram signal generator, a second characteristic diagram of the second characteristic diagram signal generator, a third characteristic diagram of the third characteristic diagram signal generator, a fourth characteristic diagram of the fourth characteristic diagram signal generator, a fifth characteristic diagram of the fifth characteristic diagram signal generator, a sixth characteristic diagram of the sixth characteristic diagram signal generator, and a seventh characteristic diagram of the seventh characteristic diagram signal generator as a function of an engine-type-dependent parameter and/or a vehicle-type-dependent parameter.

In some embodiments, the control unit is configured to select the interpolation factor and/or a first characteristic diagram of the first characteristic diagram signal generator and/or a second characteristic diagram of the second characteristic diagram signal generator and/or a third characteristic diagram of the third characteristic diagram signal generator and/or a fourth characteristic diagram of the fourth characteristic diagram signal generator and/or a fifth characteristic diagram of the fifth characteristic diagram signal generator and/or a sixth characteristic diagram of the sixth characteristic diagram signal generator and/or a seventh characteristic diagram of the seventh characteristic diagram signal generator as a function of an engine-type-dependent or vehicle-type-dependent parameter. As a result, the control can be configured in such a way that it is suitable for use for different types of internal combustion engines or in different types of vehicles or vehicle configurations. The engine-type-dependent parameter can be, for example, characteristic of a type of an internal combustion engine which is defined, for example, by the swept volume, the type or number of inlet valves or outlet valves, the presence of a turbocharger, etc. The same applies to the vehicle-type-dependent parameter which is, for example, characteristic of corresponding characteristic data which are relevant for the control of the internal combustion engine.

With the objects of the invention in view there is also provided a motor vehicle which includes a control unit including the above-defined features. Specifically, in accordance with the invention, there is provided a motor vehicle, including:

an internal combustion engine having a first camshaft; and
a control unit for controlling a phase angle of the first camshaft, the control unit including a first characteristic diagram signal generator for determining a dynamic setpoint phase angle of the first camshaft, a second characteristic diagram signal generator for determining a static setpoint phase angle of the first camshaft, and a first interpolator for determining a corrected setpoint phase angle of the first camshaft based on the dynamic setpoint phase angle of the first camshaft and on the static setpoint phase angle of the first camshaft, wherein the dynamic setpoint phase angle of the first camshaft is determined by the first characteristic diagram signal generator, and wherein the static setpoint phase angle of the first camshaft is determined by the second characteristic diagram signal generator.

According to another feature of the invention, the internal combustion engine includes a cylinder; and the control unit includes a third characteristic diagram signal generator for determining the interpolation factor based on an engine rotational speed of the internal combustion engine and/or a charge deviation of the cylinder of the internal combustion engine.

According to another feature of the invention, the internal combustion engine includes a second camshaft; and the control unit includes a fourth characteristic diagram signal generator for determining a dynamic setpoint phase angle of the second camshaft, a fifth characteristic diagram signal generator for determining a static setpoint phase angle of the second camshaft, and a second interpolator for determining a corrected setpoint phase angle of the second camshaft based on the dynamic setpoint phase angle of the second camshaft and on the static setpoint phase angle of the second camshaft, wherein the dynamic setpoint phase angle of the second camshaft is determined by the fourth characteristic diagram signal generator, and wherein the static setpoint phase angle of the second camshaft is determined by the fifth characteristic diagram signal generator.

With the objects of the invention in view there is furthermore provided, a method for controlling a phase angle of a first camshaft of an internal combustion engine, wherein the method includes the steps of:

determining a dynamic setpoint phase angle of the first camshaft based on a first characteristic diagram;

determining a static setpoint phase angle of the first camshaft based on a second characteristic diagram; and determining a corrected setpoint phase angle of the first camshaft based on an interpolation between the determined dynamic setpoint phase angle of the first camshaft and the determined static setpoint phase angle of the first camshaft.

Thus the method according to the invention for controlling a phase angle of a first camshaft of an internal combustion engine includes the following steps: determining a dynamic setpoint phase angle of the first camshaft, e.g. through the use of a first characteristic diagram signal generator, determining a static setpoint phase angle of the first camshaft, e.g. through the use of a second characteristic diagram signal generator and determining a corrected setpoint phase angle of the first camshaft by interpolation between the determined dynamic setpoint phase angle of the first camshaft and the determined static setpoint phase angle of the first camshaft.

In some embodiments, the method according to the invention also includes other steps as the ones carried out above. In some embodiments, the method according to the invention can be carried out by a control unit as has been described above. Exemplary embodiments of the invention will be described by way of example and with reference to the appended drawing.

Although the invention is illustrated and described herein as embodied in a motor vehicle, a control unit and a method for controlling a phase angle of a camshaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
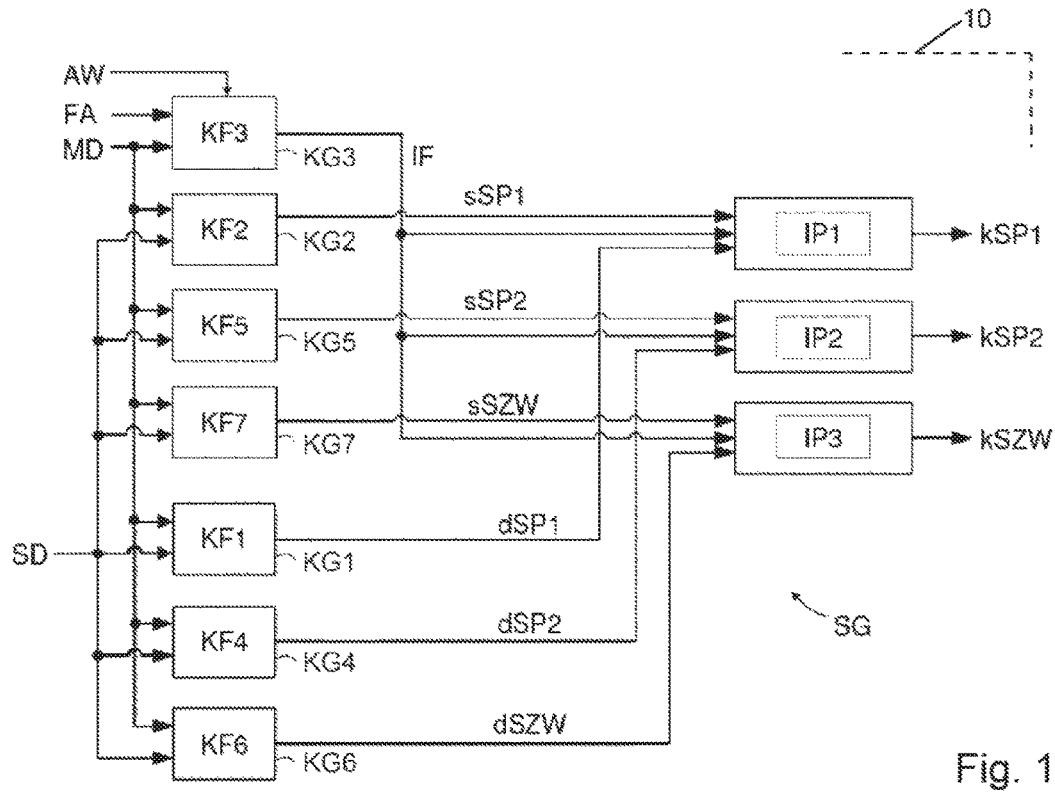
FIG. 1 is a schematic view of an exemplary embodiment of a control unit for controlling a phase angle of a first camshaft and a phase angle of a second camshaft and an ignition angle of an internal combustion engine in accordance with the invention.

Referring now to the figures of the drawing in detail and first, particularly, to FIG. 1 thereof, there is shown a control unit SG for controlling a phase angle or phase position of a first camshaft of an internal combustion engine of a motor vehicle. The dashed line 10 in FIG. 1 serves to schematically indicate a motor vehicle with an internal combustion engine which has at least one cylinder, a first camshaft, and a second camshaft. The control unit SG shown in FIG. 1 for controlling a phase angle or phase position of a first camshaft, which is an inlet camshaft here, and a phase angle of a second camshaft, which is an outlet camshaft here, and an ignition angle of an internal combustion engine includes a first characteristic diagram signal generator KG1 for determining a dynamic setpoint phase angle dSP1 of the first camshaft. The first characteristic diagram signal generator KG1 has an input interface for receiving a current engine rotational speed value MD and for receiving a current intake manifold pressure value SD of the internal combustion engine. The first characteristic diagram signal generator KG1 is configured to determine a dynamic setpoint phase angle dSP1 of an inlet camshaft on the basis of these values MD, SD.

Furthermore, the control unit SG includes a second characteristic diagram signal generator KG2, a third characteristic diagram signal generator KG3, a fourth characteristic diagram signal generator KG4, a fifth characteristic diagram signal generator KG5, a sixth characteristic diagram signal generator KG6, and a seventh characteristic diagram signal generator KG7. Each of the characteristic diagram signal generators KG1, KG2 and KG4 to KG7 has a separate characteristic diagram KF1, KF2, KF4, . . . KF7 assigned to it. The second KG2, fourth KG4, fifth KG5, sixth KG6 and seventh KG7 characteristic diagram signal generators each have an input interface for receiving a current engine rotational speed value MD and for receiving a current intake manifold pressure value SD of the internal combustion engine.

The second characteristic diagram signal generator KG2 is configured to determine a static setpoint phase angle sSP1 of the inlet camshaft on the basis of these values MD, SD. The fourth characteristic diagram signal generator KG4 is configured to determine a dynamic setpoint phase angle dSP2 of an outlet camshaft on the basis of these values MD, SD. The fifth characteristic diagram signal generator KG5 is configured to determine a static setpoint phase angle sSP2 of the outlet camshaft on the basis of these values MD, SD. The sixth characteristic diagram signal generator KG6 is configured to determine a dynamic setpoint ignition angle dSZW on the basis of these values MD, SD. The seventh characteristic diagram signal generator KG7 is configured to determine a static setpoint ignition angle sSZW on the basis of these values MD, SD.

Furthermore, the control unit SG includes a third characteristic diagram signal generator KG3 for determining the interpolation factor IF. The third characteristic diagram signal generator KG3 has an input interface for receiving a current engine rotational speed value MD and for receiving a current charge deviation FA of the internal combustion engine. The third characteristic diagram signal generator KG3 is configured to determine the interpolation factor IF on the basis of these values using its characteristic diagram KF3 stored in it.

Each of the characteristic diagram signal generators KG1 to KG7 can respectively have an analog and/or digital electronic circuit (not illustrated in detail in the figures). The digital circuit of the respective characteristic diagram signal generator can include, for example, a microprocessor and a characteristic diagram table KF1 to KF7 assigned individually to it. The respective characteristic diagram table can be stored in a retrievable fashion in a database. In the characteristic diagram tables KF1, KF2 and KF4 to KF7 (or in the associated database) possible engine rotational speed values and intake manifold pressures can represent key values through the use of which a suitable data set can be found quickly (for example by a binary search). With respect to engine rotational speed values MD and charge deviations FA this applies in a corresponding manner to the third characteristic diagram KF3.

Furthermore, the control unit SG includes a first interpolator IP1. The first interpolator IP1 has an input interface for receiving the following values: interpolation factor IF, static setpoint phase angle sSP1 for the inlet camshaft, the dynamic setpoint phase angle dSP1 of the inlet camshaft. The dynamic setpoint phase angle dSP1 of the inlet camshaft is made available by the first characteristic diagram signal generator KG1. The static setpoint phase angle sSP1 of the inlet camshaft is made available by the second characteristic diagram signal generator KG2. The first interpolator IP1 is configured to determine a corrected setpoint phase angle kSP1 of the inlet camshaft on the basis of these values.

Furthermore, the control unit SG includes a second interpolator IP2. The second interpolator IP2 has an input interface for receiving the following values: interpolation factor IF; static setpoint phase angle sSP2 for the outlet camshaft; the dynamic setpoint phase angle dSP2 of the outlet camshaft. The dynamic setpoint phase angle dSP2 of the outlet camshaft is made available by the fourth characteristic diagram signal generator KG4. The static setpoint phase angle sSP2 of the outlet camshaft is made available by the fifth characteristic diagram signal generator KG5. The second interpolator IP2 is configured to determine a corrected setpoint phase angle kSP2 of the outlet camshaft on the basis of these values.

Furthermore, the control unit SG includes a third interpolator IP3. The third interpolator IP3 has an input interface for receiving the following values: interpolation factor IF; static setpoint ignition angle sSZW; dynamic setpoint ignition angle dSZW. The dynamic setpoint ignition angle dSZW is made available by the sixth characteristic diagram signal generator KG6. The static setpoint ignition angle sSZW is made available by the seventh characteristic diagram signal generator KG7. The third interpolator IP3 is configured to determine a corrected setpoint ignition angle kSZW for the internal combustion engine on the basis of these values.

The third characteristic diagram signal generator KG3 preferably has a selection input AW. The selection input AW serves to select the interpolation factor IF and/or the first characteristic diagram KF1 of the first characteristic diagram signal generator KG1 and/or the second characteristic diagram KF2 of the second characteristic diagram signal generator KG2 and/or the third characteristic diagram KF3 of the third characteristic diagram signal generator KG3 and/or the fourth characteristic diagram KF4 of the fourth characteristic diagram signal generator KG4 and/or the fifth characteristic diagram KF5 of the fifth characteristic diagram signal generator KG5 and/or the sixth characteristic diagram KF6 of the sixth characteristic diagram signal generator KG6 and/or the seventh characteristic diagram KF7 of the seventh characteristic diagram signal generator KG7 as a function of an engine-type-dependent parameter or vehicle-type-dependent parameter or as a function of another parameter.

Through the use of the selection input AW it is possible to adjust manually or under sensor control the response dynamics of the drive machine which the internal combustion engine has, as a function of, for example, loadability of engine parts or vehicle parts, as a function of a current cargo of the vehicle, as a function of a trailer load, as a function of loadability of a payload, as a function of driver requests and/or front seat passenger requests and/or as a function of product design objectives. A sensor-controlled adjustment of the response dynamics can be effected, for example, taking into account an output of a loadability sensor, an output of a cargo sensor, an output of a trailer load sensor, an output of a payload sensor, an output of a vehicle type detection sensor and/or an output of a personalization function for vehicle users and/or front seat passengers or fellow passengers. In order to take into account the interests of individual codrivers, it may be expedient if the smallest (i.e. the most defensive) desired response dynamics of the desired response dynamics of all the codrivers (including the driver) are selected and set. A corresponding response dynamics determining concept can be applied through the use of the total set or through the use of any (real) subset of the abovementioned outputs.

Figure 2:
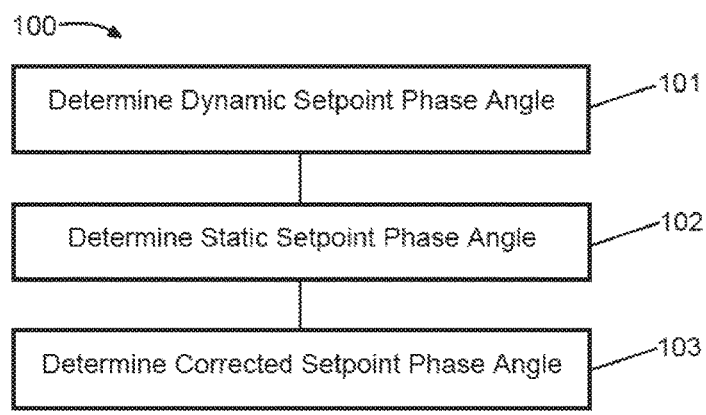
FIG. 2 is a schematic view of a sequence of a method for controlling a camshaft of an internal combustion engine in accordance with the invention.

The method 100 shown in FIG. 2 for controlling a phase angle of a camshaft of an internal combustion engine includes the following steps. In a first step 101, a dynamic setpoint phase angle dSP1 of the first camshaft is determined through the use of a first characteristic diagram signal generator KG1, as has already been explained above with respect to FIG. 1.

In a second step 102, a static setpoint phase angle sSP1 of the first camshaft is determined by the second characteristic diagram signal generator KG2, as has already been explained above with respect to FIG. 1.

In a third step 103, a corrected setpoint phase angle kSP1 of the first camshaft is determined by interpolation between the dynamic setpoint phase angle dSP1, determined by the first characteristic diagram signal generator KG1, of the first camshaft and the static setpoint phase angle sSP1, determined by the second characteristic diagram signal generator KG2, of the first camshaft. The dynamic setpoint phase angle dSP1 of the first camshaft can be determined, for example, taking into account an engine rotational speed MD and an intake manifold pressure SD, as has been stated above. The same applies for the determination of the static setpoint phase angle sSP1.

During the determination of the corrected setpoint phase angle kSP1 of the first camshaft, an interpolation factor IF is preferably taken into account. The interpolation factor IF can be determined, for example, through the use of a third characteristic diagram signal generator KG3 taking into account the engine rotational speed MD and a charge deviation FA, as explained above. The interpolation factor IF and/or the first characteristic diagram KF1 of the first characteristic diagram signal generator KG1 and/or the second characteristic diagram KF2 of the second characteristic diagram signal generator KG2 and/or the third characteristic diagram KF3 of the third characteristic diagram signal generator KG3 and/or the fourth characteristic diagram KF4 of the fourth characteristic diagram signal generator KG4 and/or the fifth characteristic diagram KF5 of the fifth characteristic diagram signal generator KG5 and/or the sixth characteristic diagram KF6 of the sixth characteristic diagram signal generator KG6 and/or the seventh characteristic diagram KF7 of the seventh characteristic diagram signal generator KG7 can be selected, for example, as a function of an engine-type-dependent parameter or through the use of an input variable of the selection input AW, as stated above.

For the inputting of the engine rotational speed information, intake manifold pressure information and the outputting of the information relating to the dynamic setpoint phase angle, the electronic circuit can respectively have digital (or analog) input interfaces and output interfaces, as stated above.

LIST OF REFERENCE CHARACTERS

AW Selection input
dSP1 Dynamic setpoint phase angle of the first camshaft (inlet camshaft)
dSP2 Dynamic setpoint phase angle of the second camshaft (outlet camshaft)
dSZW Dynamic setpoint ignition angle
FA Charge deviation
IF Interpolation factor
kSP1 Corrected setpoint phase angle of the first camshaft (inlet camshaft)
kSP2 Corrected setpoint phase angle of the second camshaft (outlet camshaft)
kSZW Corrected setpoint ignition angle
KF1 First characteristic diagram
KF2 Second characteristic diagram
KF3 Third characteristic diagram
KF4 Fourth characteristic diagram
KF5 Fifth characteristic diagram
KF6 Sixth characteristic diagram
KF7 Seventh characteristic diagram
KG1 First characteristic diagram signal generator
KG2 Second characteristic diagram signal generator
KG3 Third characteristic diagram signal generator
KG4 Fourth characteristic diagram signal generator
KG5 Fifth characteristic diagram signal generator
KG6 Sixth characteristic diagram signal generator
KG7 Seventh characteristic diagram signal generator
MD Engine rotational speed
SD Intake manifold pressure
SG Control unit
sSP1 Static setpoint phase angle of the first camshaft (inlet camshaft)
sSP2 Static setpoint phase angle of the second camshaft (outlet camshaft)
sSZW Static setpoint ignition angle
100 Method for controlling a first camshaft of an internal combustion engine
101 Determining a dynamic setpoint phase angle of the first camshaft
102 Determining a static setpoint phase angle of the first camshaft
103 Determining a corrected setpoint phase angle of the first camshaft

What is claimed is:

1. A control unit for controlling a phase angle of a first camshaft of an internal combustion engine, comprising:
   a first characteristic diagram signal generator for determining a dynamic setpoint phase angle of the first camshaft, wherein the dynamic setpoint phase angle of the first camshaft is optimized with respect to a maximum torque output;
   a second characteristic diagram signal generator for determining a static setpoint phase angle of the first camshaft, wherein the static setpoint phase angle of the first camshaft is optimized with respect to an optimum efficiency level of the internal combustion engine; and
   a first interpolator for determining a corrected setpoint phase angle of the first camshaft based on the dynamic setpoint phase angle of the first camshaft and on the static setpoint phase angle of the first camshaft, wherein the dynamic setpoint phase angle of the first camshaft is determined by said first characteristic diagram signal generator, and wherein the static setpoint phase angle of the first camshaft is determined by the second characteristic diagram signal generator, wherein said first characteristic diagram signal generator is configured to determine an output value made available by it, based on an engine rotational speed of the internal combustion engine and on an intake manifold pressure of the internal combustion engine, and wherein the phase angle of the first camshaft is adjusted based on the corrected setpoint phase angle.

2. The control unit according to claim 1, wherein the corrected setpoint phase angle of the first camshaft is determined based on a torque request.

3. The control unit according to claim 1, wherein the first interpolator is configured to determine the corrected setpoint phase angle of the first camshaft based on an interpolation factor.

4. The control unit according to claim 3, further including a third characteristic diagram signal generator for determining the interpolation factor based on at least one of an engine rotational speed of the internal combustion engine and a charge deviation of a cylinder of the internal combustion engine.

5. The control unit according to claim 4, further including:
   a fourth characteristic diagram signal generator for determining a dynamic setpoint phase angle of a second camshaft of the internal combustion engine;
   a fifth characteristic diagram signal generator for determining a static setpoint phase angle of the second camshaft; and
   a second interpolator for determining a corrected setpoint phase angle of the second camshaft based on the dynamic setpoint phase angle of the second camshaft and on the static setpoint phase angle of the second camshaft, wherein the dynamic setpoint phase angle of the second camshaft is determined by the fourth characteristic diagram signal generator, and wherein the static setpoint phase angle of the second camshaft is determined by the fifth characteristic diagram signal generator.

6. The control unit according to claim 5, further including:
a sixth characteristic diagram signal generator for determining a dynamic setpoint ignition angle of the internal combustion engine;
a seventh characteristic diagram signal generator for determining a static setpoint ignition angle of the internal combustion engine; and
a third interpolator for determining a corrected setpoint ignition angle based on the dynamic setpoint ignition angle of the internal combustion engine determined by the sixth characteristic diagram signal generator and on the static setpoint ignition angle of the internal combustion engine determined by the seventh characteristic diagram signal generator.

7. The control unit according to claim 5, wherein said second interpolator is configured to determine the corrected setpoint phase angle of the second camshaft based on the interpolation factor.

8. The control unit according to claim 6, wherein said third interpolator is configured to determine the corrected setpoint ignition angle based on the interpolation factor.

9. The control unit according to claim 6, wherein at least one characteristic diagram signal generator selected from the group consisting of said second characteristic diagram signal generator, said fourth characteristic diagram signal generator, said fifth characteristic diagram signal generator, said sixth characteristic diagram signal generator, and said seventh characteristic diagram signal generator is configured to determine an output value respectively made available by it, based on at least one of the engine rotational speed of the internal combustion engine and the intake manifold pressure of the internal combustion engine.

10. The control unit according to claim 6, wherein the control unit is configured to select at least one parameter selected from the group consisting of the interpolation factor, a first characteristic diagram of the first characteristic diagram signal generator, a second characteristic diagram of the second characteristic diagram signal generator, a third characteristic diagram of the third characteristic diagram signal generator, a fourth characteristic diagram of the fourth characteristic diagram signal generator, a fifth characteristic diagram of the fifth characteristic diagram signal generator, a sixth characteristic diagram of the sixth characteristic diagram signal generator, and a seventh characteristic diagram of the seventh characteristic diagram signal generator as a function of at least one of an engine-type-dependent parameter and a vehicle-type-dependent parameter.

11. A motor vehicle, comprising:
an internal combustion engine having a first camshaft; and
a control unit for controlling a phase angle of said first camshaft, said control unit including a first characteristic diagram signal generator for determining a dynamic setpoint phase angle of said first camshaft, wherein the dynamic setpoint phase angle of the first camshaft is optimized with respect to a maximum torque output, a second characteristic diagram signal generator for determining a static setpoint phase angle of said first camshaft, wherein the static setpoint phase angle of the first camshaft is optimized with respect to an optimum efficiency level of the internal combustion engine, and a first interpolator for determining a corrected setpoint phase angle of said first camshaft based on the dynamic setpoint phase angle of said first camshaft and on the static setpoint phase angle of said first camshaft, wherein the dynamic setpoint phase angle of said first camshaft is determined by said first characteristic diagram signal generator, and wherein the static setpoint phase angle of said first camshaft is determined by the second characteristic diagram signal generator, wherein said first characteristic diagram signal generator is configured to determine an output value made available by it, based on an engine rotational speed of the internal combustion engine and on an intake manifold pressure of the internal combustion engine, and wherein the phase angle of the first camshaft is adjusted based on the corrected setpoint phase angle.

12. The motor vehicle according to claim 11, wherein the corrected setpoint phase angle of said first camshaft is determined based on a torque request.

13. The motor vehicle according to claim 12, wherein said first interpolator is configured to determine the corrected setpoint phase angle of said first camshaft based on an interpolation factor.

14. The motor vehicle according to claim 13, wherein:
said internal combustion engine further includes a cylinder; and
said control unit further includes a third characteristic diagram signal generator for determining the interpolation factor based on at least one of an engine rotational speed of said internal combustion engine and a charge deviation of said cylinder of said internal combustion engine.

15. The motor vehicle according to claim 14, wherein:
said internal combustion engine further includes a second camshaft; and
said control unit further includes a fourth characteristic diagram signal generator for determining a dynamic setpoint phase angle of said second camshaft, a fifth characteristic diagram signal generator for determining a static setpoint phase angle of said second camshaft, and a second interpolator for determining a corrected setpoint phase angle of said second camshaft based on the dynamic setpoint phase angle of said second camshaft and on the static setpoint phase angle of said second camshaft, wherein the dynamic setpoint phase angle of said second camshaft is determined by said fourth characteristic diagram signal generator, and wherein the static setpoint phase angle of said second camshaft is determined by said fifth characteristic diagram signal generator.

16. The motor vehicle according to claim 15, wherein said control unit further includes:
a sixth characteristic diagram signal generator for determining a dynamic setpoint ignition angle of said internal combustion engine;
a seventh characteristic diagram signal generator for determining a static setpoint ignition angle of said internal combustion engine; and
a third interpolator for determining a corrected setpoint ignition angle based on the dynamic setpoint ignition angle of said internal combustion engine determined by said sixth characteristic diagram signal generator and on the static setpoint ignition angle of said internal combustion engine determined by said seventh characteristic diagram signal generator.

17. The motor vehicle according to claim 16, wherein:
said second interpolator is configured to determine the corrected setpoint phase angle of said second camshaft based on the interpolation factor; and
said third interpolator is configured to determine the corrected setpoint ignition angle based on the interpolation factor.

18. The motor vehicle according to claim 17, wherein at least one characteristic diagram signal generator selected from the group consisting of said second characteristic diagram signal generator, said fourth characteristic diagram signal generator, said fifth characteristic diagram signal generator, said sixth characteristic diagram signal generator, and said seventh characteristic diagram signal generator is configured to determine an output value respectively made available by it, based on at least one of the engine rotational speed of said internal combustion engine and the intake manifold pressure of said internal combustion engine.

19. The motor vehicle according to claim 18, wherein said control unit is configured to select at least one parameter selected from the group consisting of the interpolation factor, a first characteristic diagram of said first characteristic diagram signal generator, a second characteristic diagram of said second characteristic diagram signal generator, a third characteristic diagram of said third characteristic diagram signal generator, a fourth characteristic diagram of said fourth characteristic diagram signal generator, a fifth characteristic diagram of said fifth characteristic diagram signal generator, a sixth characteristic diagram of said sixth characteristic diagram signal generator, and a seventh characteristic diagram of said seventh characteristic diagram signal generator as a function of at least one of an engine-type-dependent parameter and a vehicle-type-dependent parameter.

20. A method for controlling a phase angle of a first camshaft of an internal combustion engine, the method comprising:
   determining a dynamic setpoint phase angle of the first camshaft based on a first characteristic diagram, wherein the dynamic setpoint phase angle of the first camshaft is made available as an output value determined based on an engine rotational speed of the internal combustion engine and on an intake manifold pressure of the internal combustion engine and wherein the dynamic setpoint phase angle of the first camshaft is optimized with respect to a maximum torque output;
   determining a static setpoint phase angle of the first camshaft based on a second characteristic diagram, wherein the static setpoint phase angle of the first camshaft is optimized with respect to an optimum efficiency level of the internal combustion engine;
   determining a corrected setpoint phase angle of the first camshaft based on an interpolation between the determined dynamic setpoint phase angle of the first camshaft and the determined static setpoint phase angle of the first camshaft; and
   adjusting the phase angle of the first camshaft based on the corrected setpoint phase angle.

* * * * *